United States Patent
Nashiki et al.

[11] Patent Number: 5,820,272
[45] Date of Patent: Oct. 13, 1998

[54] BEARING STRUCTURE FOR A ROTATING SHAFT

[75] Inventors: Masayuki Nashiki, Komaki; Yoshiki Ohtake, Kohnan, both of Japan

[73] Assignee: Okuma Corporation, Aichi-ken, Japan

[21] Appl. No.: 810,158

[22] Filed: Feb. 26, 1997

[30] Foreign Application Priority Data

Feb. 26, 1996 [JP] Japan .................................. 8-038505

[51] Int. Cl.$^6$ ............................ F16C 19/04; F16C 17/22
[52] U.S. Cl. ............................................. 384/461; 384/493
[58] Field of Search ................................... 384/461, 513, 384/493, 504

[56] References Cited

U.S. PATENT DOCUMENTS

| | | | |
|---|---|---|---|
| 2,488,825 | 11/1949 | Palumbo | 384/461 X |
| 4,045,100 | 8/1977 | Beauchet | 384/461 |

FOREIGN PATENT DOCUMENTS

| | | | |
|---|---|---|---|
| 210527 | 6/1909 | Germany | 384/461 |
| 1129117 | 5/1962 | Germany | 384/461 |
| 56-147920 | 11/1981 | Japan . | |
| 35216 | 2/1990 | Japan | 384/493 |

*Primary Examiner*—Thomas R. Hannon
*Attorney, Agent, or Firm*—Lahive & Cockfield, LLP

[57] ABSTRACT

An angular contact bearing (100) has a plurality of first and second rolling elements (1,2) interposed between a rotating shaft (3) and a fixed part (4). An outer ring (5) is secured to the fixed part (4). Formed on the inner periphery of the outer ring (5) is a first rolling contact surface (1a) which is in contact with the first rolling elements (1) on the fixed part side at a predetermined angle. An inner ring (8) is secured to the rotating shaft (3) by nuts (9). Formed on the outer periphery of the inner ring (8) is a second rolling contact surface (1b) which is in contact with the first rolling elements (1) on the rotating shaft side at a predetermined angle. Formed on its inner periphery is a third rolling contact surface (2a) which is in contact with the second rolling elements (2) on the fixed part side at a predetermined angle. An Angular member (6) is secured to the outer ring (5). The Angular member (6) has a fourth rolling contact surface (2b) formed on its inner periphery. The fourth rolling contact surface (2b) is in contact with each second rolling elements (1) on the rotating shaft side at a predetermined angle. The angle at which the first and second rolling elements (1,2) are in contact with the first to fourth rolling contact surfaces (1a, 1b, 2a, and 2c) is set so that, as the temperature of the rotating shaft (3) rises, the shaft (3) itself is displaced to the direction opposite to that of the thermal displacement of a tool (22) attached to the rotating shaft (3).

13 Claims, 5 Drawing Sheets

BEARING STRUCTURE FOR A ROTATING SHAFT

BACKGROUND OF THE INVENTION

1. Field of the Invention

The present invention relates to an angular contact bearing attached to a fixed part for supporting a rotating shaft. More particularly, the present invention relates to an angular contact bearing suitable for supporting the main shaft of a machine tool or a similar shaft that requires high-speed, high-precision rotation.

2. Description of the Prior Art

Figure 12:
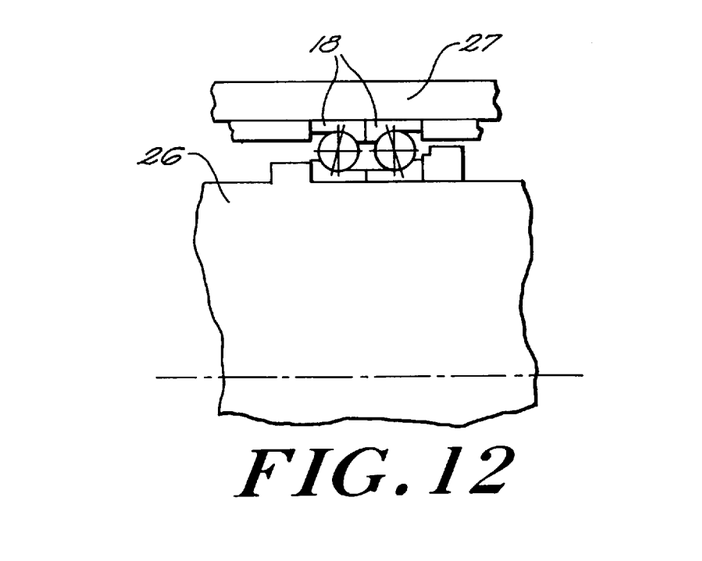
FIG. 12 is a partial cross sectional view of a known bearing structure.

FIG. 12 shows a known angular contact ball bearing 18 which is mounted between a rotational shaft 26 rotated by a motor (not shown) and a fixed part 27.

As the main shafts of machine tools are designed to rotate at increasingly higher speed, there exist strong demands for main shafts having greater reliability, a longer operating life, lower heat build-up, a higher processing accuracy, and lower manufacturing cost. One obstacle to meeting these demands is heat build-up in the bearing caused by high-speed rotation of the main shaft. As a corrective measure, heat is often removed from the bearing by cooling the fixed part with oil or other media. However, this method removes heat only from the fixed part, so that if it is applied to the bearing shown in FIG. 12, a temperature difference develops between the fixed part 27 and the rotational shaft 26. This temperature difference in turn causes a difference in the thermal expansion in the radial direction between the outer race and the inner race of the angular contact ball bearing 18. The difference in the thermal expansion creates force in the bearing 18 that presses and therefore deforms the rolling elements, increasing the pressure on the rolling elements and the rolling contact surfaces, which adds to the heat build-up. Therefore, if the rotational speed of the main shaft is increased, burning may occur in the conventional bearing due to an excessive pressure.

A tool may be attached to one end of the rotating shaft 26 for carrying out machining under precise position control. However, since heat cannot be easily removed from the inner ring of the angular contact ball bearing 18, the heat tends to cause thermal displacement in the axial direction of the rotating shaft 26 and the attached tool, which lowers the machining accuracy, particularly when the shaft 26 is rotated at a high speed. One method known in the art for cooling the rotating shaft 26 and the inner ring of the bearing involves passing a coolant through the rotatable parts. However, a disadvantage of this method is the higher cost incurred due to the complex structure that needs to be formed in the rotating shaft for dispersing the coolant.

SUMMARY OF THE INVENTION

In view of the above-identified problems, it is an object of the present invention to provide a simply structured bearing that reduces heat build-up therein.

It is another object of the present invention to provide a simply structured bearing with a higher reliability and a longer operating life.

It is still another object of the present invention to provide a simply structured bearing that improves the machining accuracy of machine tools.

The above object and other related objects are realized by providing a bearing structure for supporting a rotating shaft on a fixed part, the bearing structure including an angular contact anti-friction bearing which comprises:

- a plurality of first rolling elements and a plurality of second rolling elements both interposed between the rotating shaft and the fixed part;
- a fixed member provided on the fixed part;
- a rotatable member provided on the rotating shaft;
- a first rolling contact surface formed on the fixed member so as to be in contact with the first rolling elements at a predetermined angle on the fixed part side;
- a second rolling contact surface formed on the rotatable member so as to be in contact with the first rolling elements at a predetermined angle on the rotating shaft side,
- a third rolling contact surface formed on the rotatable member so as to be in contact with the second rolling elements at a predetermined angle on the fixed part side; and
- a fourth rolling contact surface formed on the fixed member so as to be in contact with the second rolling elements at a predetermined angle on the rotating shaft side.

According to one aspect of the invention, the angular contact anti-friction bearing supports the rotating shaft on the inner side of the fixed member and the fixed member is secured to the inner periphery of the fixed part, and the rotatable member is secured to the outer periphery of the rotating shaft.

According to another aspect of the invention, the fixed member comprises an outer ring secured to the fixed part and an angular member secured to one end of the outer ring, wherein the first rolling contact surface is formed on the outer ring and the fourth rolling contact surface is formed on the angular member.

According to still another aspect, the bearing structure further comprises a means for locating the outer ring and the angular member in a predetermined position on the fixed part.

According to yet another aspect, the rotatable member includes an inner ring which is independent of the rotating shaft, and a means for securing the inner ring to a predetermined position on the rotating shaft.

In accordance with a further aspect of the present invention, the rotatable member is integrally formed with the rotating shaft.

Preferably, the rotatable member includes a portion protruding substantially in parallel to the rotating shaft, with the second rolling contact surface formed on the outer periphery of the protruding portion and the third rolling contact surface formed on the inner periphery of the protruding portion.

The present invention further provides for a bearing structure for supporting a main shaft on the inner side of a fixed part of a main shaft head in a machine tool, the main shaft being adapted to mount a workpiece engaging element on a front end thereof, the bearing structure including an angular contact anti-friction bearing supporting the main shaft and a radial roller bearing supporting the main shaft so as to allow axial displacement of the main shaft, the angular contact anti-friction bearing being located between the workpiece engaging element and the radial roller bearing, the angular contact anti-friction bearing comprising:

- a plurality of first rolling elements and a plurality of second rolling elements both interposed between the main shaft and the fixed part;
- a fixed member secured to the inner periphery of the fixed part;
- a rotatable member secured to the outer periphery of the main shaft;

a first rolling contact surface formed on the fixed member so as to be in contact with the first rolling elements at a predetermined angle on the fixed part side;

a second rolling contact surface formed on the rotatable member so as to be in contact with the first rolling elements at a predetermined angle on the main shaft side, a third rolling contact surface formed on the rotatable member so as to be in contact with the second rolling elements at a predetermined angle on the fixed part side; and a fourth rolling contact surface formed on the fixed member so as to be in contact with the second rolling elements at a predetermined angle on the main shaft side, wherein the third rolling contact surface is located on the workpiece engaging element side of the center of the second rolling elements and the fourth rolling contact surface is located on the roller bearing side of the center of the second rolling elements.

According to one aspect, the fixed member comprises an outer ring secured to the fixed part and an angular member secured to the roller bearing side of the outer ring, with the first rolling contact surface formed on the outer ring and the fourth rolling contact surface formed on the angular member.

According to another aspect, the rotatable member includes a portion protruding substantially in parallel to the main shaft toward the roller bearing, with the second rolling contact surface formed on the outer periphery of the protruding portion and the third rolling contact surface formed on the inner periphery of the protruding portion.

According to another aspect, the workpiece engaging element is a tool.

BRIEF DESCRIPTION OF THE DRAWINGS

For a fuller understanding of the nature and objects of the present invention, reference should be made to the following detailed description and the accompanying drawings, in which.

DETAILED DESCRIPTION OF THE PREFERRED EMBODIMENTS

Figure 1:
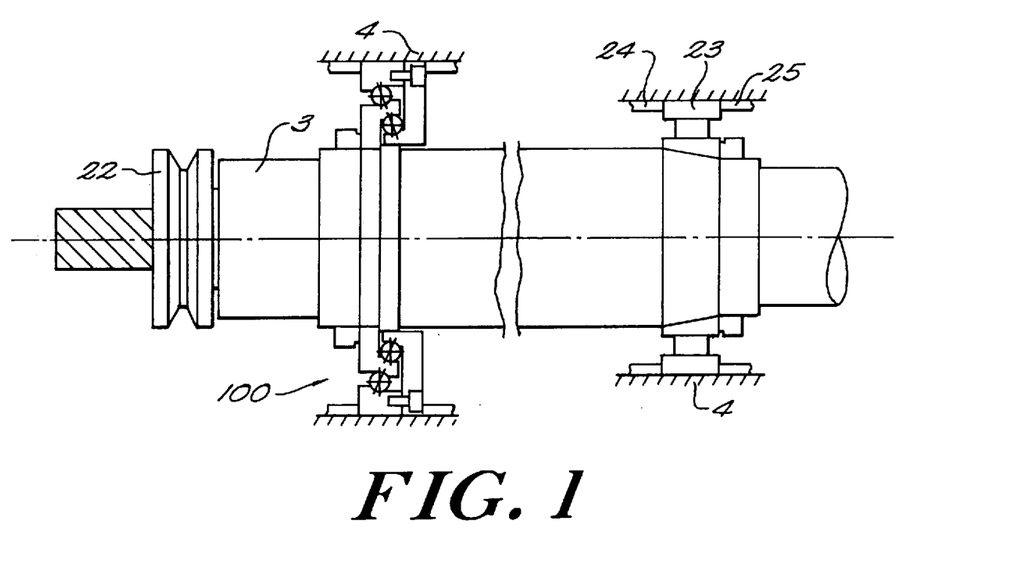
FIG. 1 is a partial cross sectional view of a bearing structure of a first embodiment according to the present invention.
Figure 2:
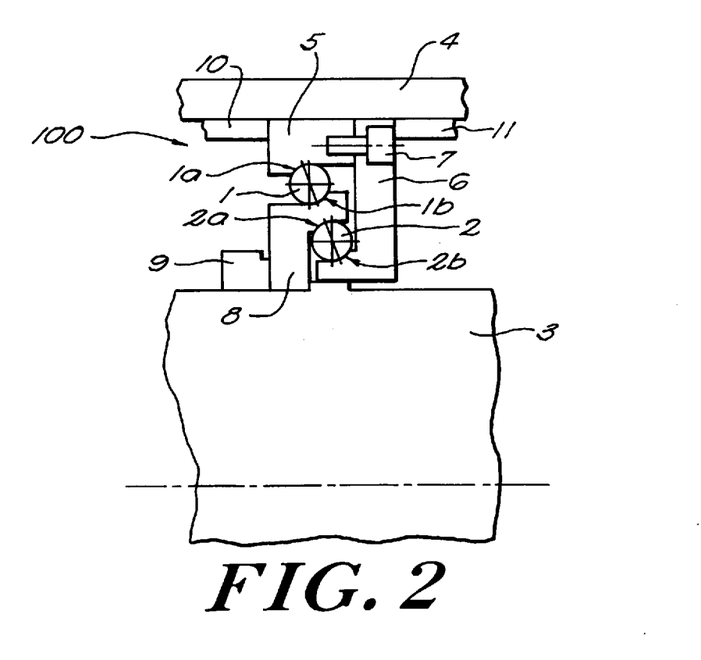
FIG. 2 is an enlarged view of the bearing structure of FIG. 1.

Preferred embodiments of the present invention will be explained hereinafter with reference to the attached drawings. First embodiment FIGS. 1 and 2 illustrate the first embodiment of the invention. Shown in FIG. 1 is a part of a machine tool, in which reference numeral 4 designates a fixed part of a main shaft head of the machine tool. An angular contact bearing 100 and a roller bearing 23 are secured to the fixed part 4. A rotating shaft 3 which serves as a main shaft is supported by the bearing 100. The rotating shaft 3 is also supported by the roller bearing 23 in a manner that allows the shaft 3 to be minutely displaced in the axial direction. Attached to one end of the rotating shaft 3 is a tool 22 which is placed under position control in the machine tool to maintain a high degree of machining accuracy. The roller bearing 23 is secured to the fixed part 4 by collars 24 and 25.

As shown in FIG. 2, the angular contact bearing 100 has a plurality of first and second rolling elements 1 and 2 interposed between the rotating shaft 3 and the fixed part 4. An outer ring 5 is mechanically secured to the fixed part 4 by collars 10 and 11. Formed on the inner periphery of the outer ring 5 is a first rolling contact surface 1a which is in contact with the first rolling elements 1 on the fixed part side at a predetermined angle. An inner ring 8 is secured to the rotating shaft 3 by nuts 9 (only one shown in FIG. 2). Formed on the outer periphery of the inner ring 8 is a second rolling contact surface 1b which is in contact with the first rolling elements 1 on the rotating shaft side at a predetermined angle. Formed on its inner periphery is a third rolling contact surface 2a which is in contact with the second rolling elements 2 on the fixed part side at a predetermined angle.

An angular member 6 is secured to the outer ring 5 by bolts 7 (only one shown in FIG. 2) having a fourth rolling contact surface 2b formed on its inner periphery. The fourth rolling contact surface 2b is in contact with the second rolling elements 2 on the rotating shaft side at a predetermined angle. The angles at which the first and second rolling elements 1 and 2 are in contact with the first to fourth rolling contact surfaces 1a, 1b, 2a, and 2c are set so that, as the temperature of the rotating shaft 3 rises, the shaft 3 is displaced to the right as in FIG. 1. Meanwhile, the tool 22 is displaced in the opposite direction (to the left as in FIG. 1) due to the generated heat.

In the structure explained above, the bearing 100 generates heat when a motor (not shown) drives the rotating shaft 3. The heat build-up causes thermal expansion of the rotating shaft 3 in the radial direction, which in turn causes radial displacement of the second and third rolling contact surfaces 1b and 2a of the inner ring 8 since the ring is secured to the rotating shaft 3. The displacement of the second rolling contact surface 1b increases the pressure on the first rolling elements 1. At the same time, the displacement of the third rolling contact surface 2a decreases the pressure on the second rolling elements 2, thus creating different pressures on the rolling elements 1 and 2. As explained before, the rotating shaft 3 can be minutely displaced in the axial direction. Therefore, the different levels of pressure cause the rotating shaft 3 to be very slightly displaced in the direction that reduces the pressure difference, that is, in the right direction in FIG. 2. Thus, the variations in the pressure on the rolling contact surfaces can be minimized even if a temperature difference develops between the fixed part side and the rotating shaft side of the bearing 100. Concurrently with the minute displacement of the rotating shaft 3, the tool 20 is also axially displaced in the opposite direction. The amount of displacement of the rotating shaft 3 and that of the tool 20 in the opposite direction offset each other so as to eliminate the negative effect of the thermal displacement on the tool 22 thus achieving high machining accuracy.

With reference to FIGS. 2–6, the following are simulations of the amount of deformation of the rolling elements 1 and 2 caused by the thermal expansion in the radial direction of the rotating shaft 3 and of the amount of thermal displacement of the rotating shaft 3.

Figure 3:
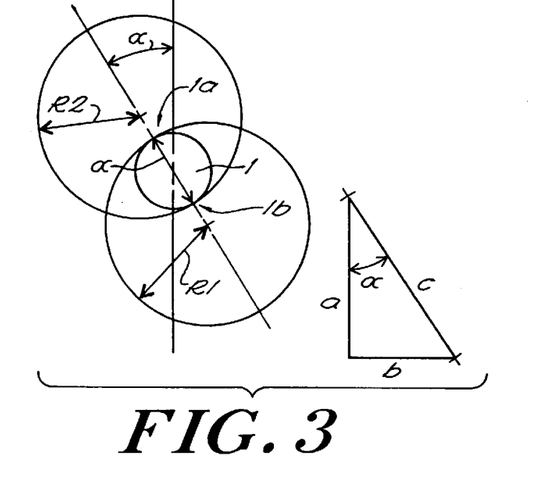
FIG. 3 is a diagram showing a model of the initial state of the first rolling element of the bearing structure of FIG. 1.
Figure 5:
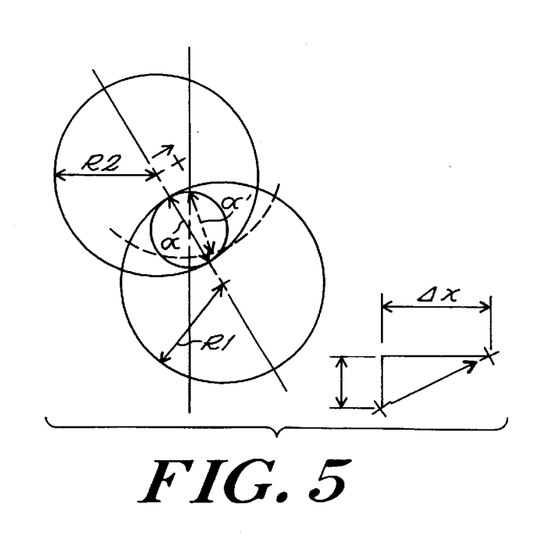
FIG. 5 is a diagram showing a model of the first rolling element of the bearing structure of FIG. 1 following a temperature rise in a rotating shaft.

In FIGS. 3 and 5:
d=diameter of each rolling element 1;
r1=radius of the rolling contact surface 1a;
r2=radius of the rolling contact surface 1b; and
α=contact angle.

Figure 4:
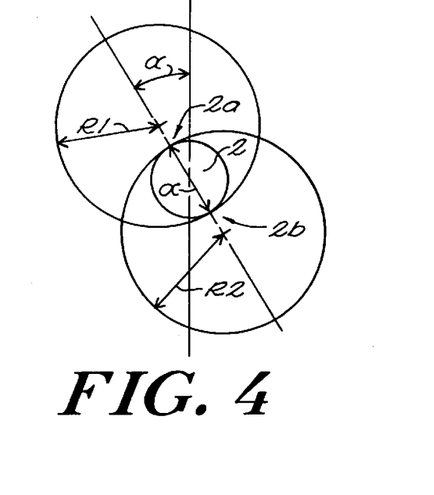
FIG. 4 is a diagram showing a model of the initial state of a second rolling element of the bearing structure of FIG. 1.
Figure 6:
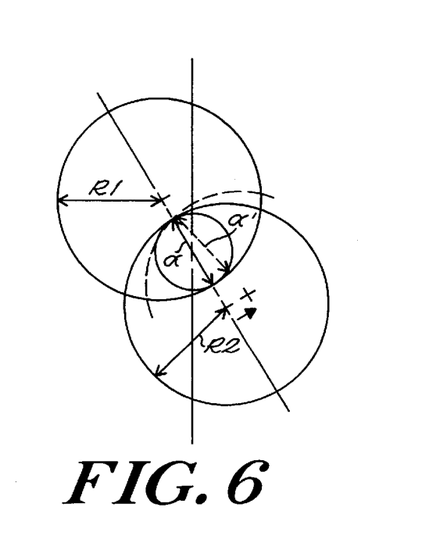
FIG. 6 is a diagram showing a model of the second rolling element of the bearing structure of FIG. 1 following a temperature rise in a rotating shaft.

In FIGS. 4 and 6:
d=diameter of each rolling element 2;
r2=radius of the rolling contact surface 2a;
r1=radius of the rolling contact surface 2b; and
α=contact angle.

Then, with reference to FIGS. 3 and 4, the following expressions are established concerning the rolling elements 1 and 2:

$$c = r1 + r2 - d \tag{1}$$

$$a = c^* \cos \alpha \tag{2}$$

$$b = c^* \sin \alpha \tag{3}$$

If the temperature of the rotating shaft 3 rises by $\Delta t$ degrees Celsius so as to cause expansion of k of its radius, the rolling contact surfaces 1b and 2a of the inner ring 8 are displaced by k as the ring 8 is secured to the shaft 3 (the thermal expansion of the rolling contact surfaces is not considered). If the rotating shaft 3 is minutely displaced in the axial direction by $\Delta x$ due to the displacement of k, the diameter of the first rolling element 1 is given as follows from FIGS. 5 and 6:

$$a' = c^* \cos \alpha + k \tag{4}$$

$$b' = c^* \sin \alpha - \Delta x \tag{5}$$

$$c' = (a'^2 + b'^2)^{1/2} \tag{6}$$

thus, $$d' = r1 + r2 - c' \tag{7}$$

Likewise, the diameter of the second rolling element 2 is given as follows:

$$a'' = c^* \cos \alpha - k \tag{8}$$

$$b'' = c^* \sin \alpha + \Delta x \tag{9}$$

$$c'' = (a''^2 + b''^2)^{1/2} \tag{10}$$

thus, $$d'' = r1 + r2 - c'' \tag{11}$$

If the rotating shaft 3 is displaced so as to equalize the pressure on the rolling elements 1 and 2, that is, to equalize the diameters of the rolling elements 1 and 2 following the displacement of the rotating shaft 3, the displacement amount $\Delta x$ is given as follows: with d'=d", $$\Delta x = k^*(\cos \alpha / \sin \alpha) \tag{12}$$

The deformation amount e of the rolling elements 1 and 2 is given as follows:

$$e = d - d' = d - (r1 + r2 - c'') \tag{13}$$

from (4), (5), and (12), $$c' = (a'^2 + b'^2)^{1/2} = (c^2 + k^2/\sin^2 \alpha)^{1/2} \tag{14}$$

thus, $$e = d - (r1 + r2 - (c^2 + k^2/\sin^2 \alpha)^{1/2}) \tag{15}$$

In the conventional bearing, the amount of deformation of the rolling element E is given as follows from (4), (5), and $\Delta x = 0$:

$$E = d - (r1 + r2 - (c^2 + 2^* c^* k^* \cos \alpha + k^2)^{1/2}) \tag{16}$$

Figure 7:
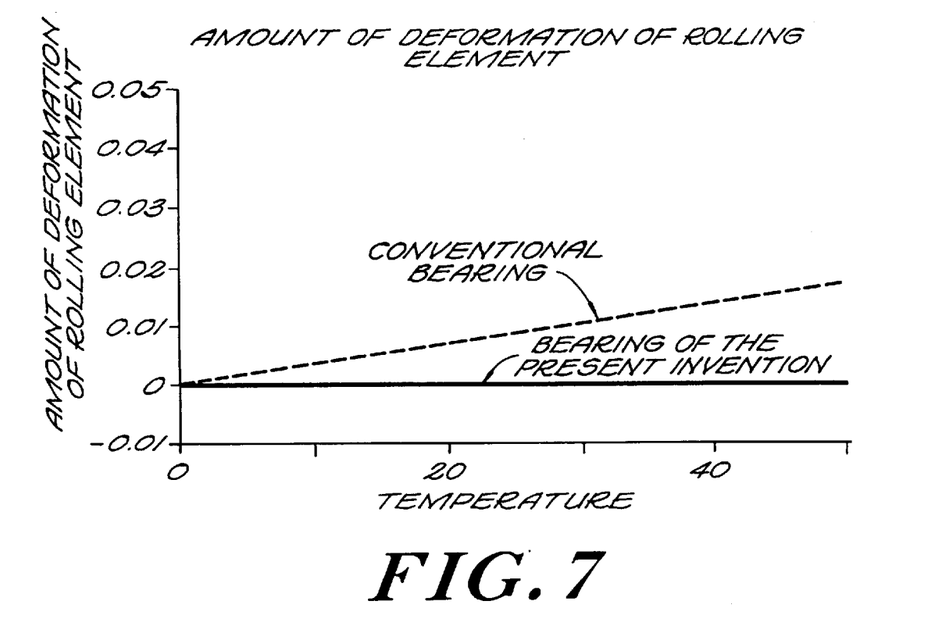
FIG. 7 is a graph representing the relationship between the amount of deformation in the rolling elements and the temperature of the rotating shaft according to the present invention and the same deformation-temperature relationship of a known device.

The change in the amount of deformation of the rolling element caused by the radial thermal expansion of the rotating shafts of the bearing 100 of the embodiment was calculated by using expression (15) with the temperature of the rolling shafts as a variable under the condition given below. Likewise, the same of the conventional bearing was calculated by using expression (16) under the same condition. The result is shown in FIG. 7. Also, FIG. 8 shows the result of the calculation of the axial displacement of the main shaft of the embodiment.

Diameter of each rolling element (d): 7.9375 [mm]
Radius of rolling contact surfaces (r1): 7.9375 [mm]
Radius of rolling contact surfaces (r2): 7.9375 [mm]
Contact angle (α): 20 [deg.]
Diameter of rotating shaft: 60 [mm]
Coefficient of thermal expansion of rotating shaft: $12^*10^{-6}$ [1/k]

It is clearly seen from the graph of FIG. 7 that the increase in the amount of deformation of the rolling elements, that is, the increase in the pressure on the rolling contact surfaces, is very small while the conventional bearing exhibits a considerable increase. Therefore, the angular contact bearing 100 of the embodiment effectively prevents burning caused by an excessive pressure due to a high speed rotation of the main shaft, thereby prolonging its operating life.

Figure 8:
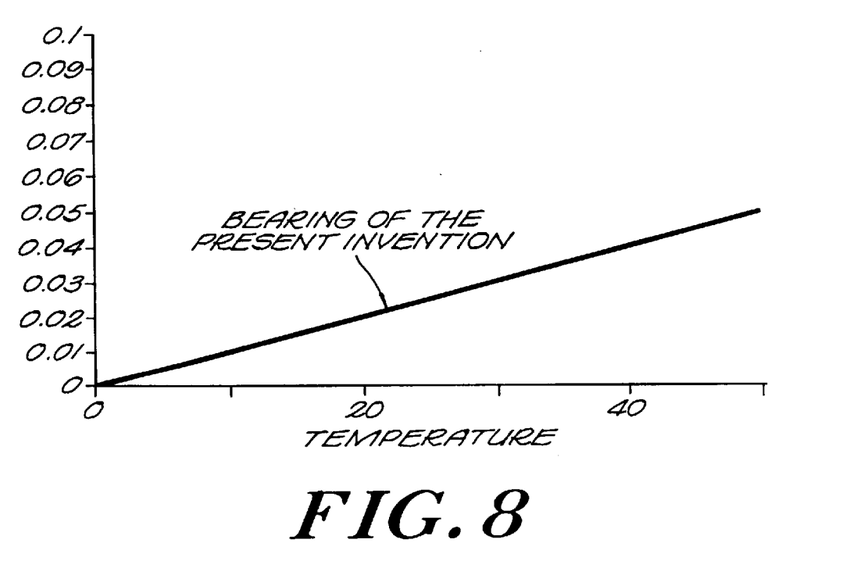
FIG. 8 is a graph representing the displacement-temperature rise curve for the rotating shaft according to the present invention.
Figure 9:
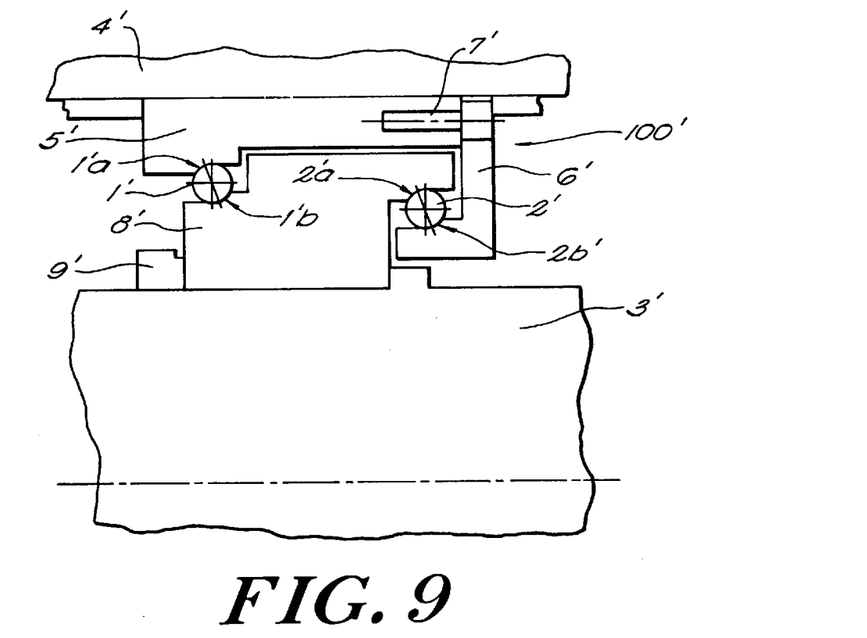
FIG. 9 is a partial cross sectional view of a bearing structure of a second embodiment according to the present invention.
Figure 10:
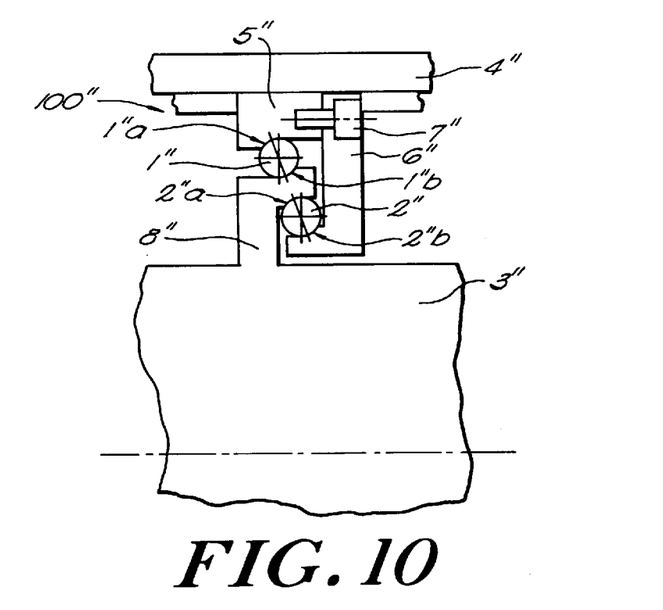
FIG. 10 is a partial cross sectional view of a bearing structure of a third embodiment according to the present invention.
Figure 11:
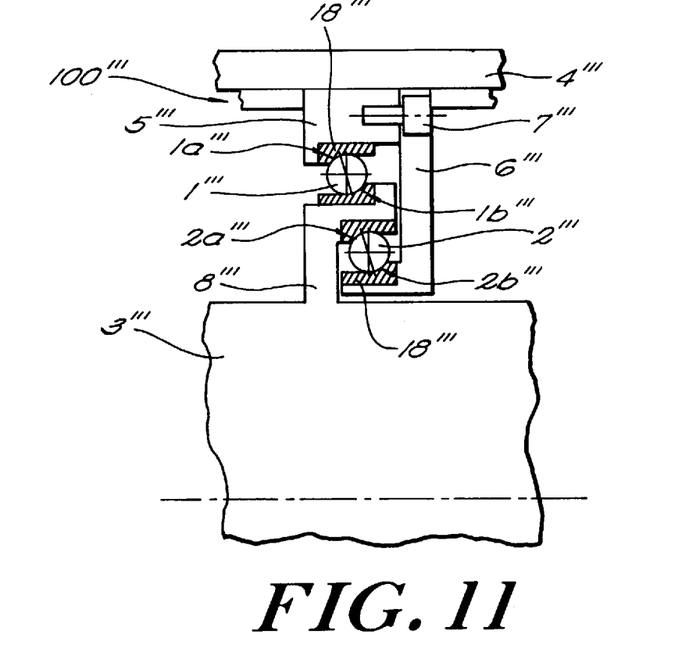
FIG. 11 is a partial cross sectional view of a bearing structure of a fourth embodiment according to the present invention.

FIG. 8 shows the result of calculation of the axial displacement of the main shaft of the embodiment. FIG. 8 shows that the angular contact bearing 100 allows the rotating shaft to be minutely displaced in the axial direction as the temperature of the rotating shaft rises. If the rotating shaft is designed to be displaced in the opposite direction to that of the thermal displacement of the attached tool, it eliminate the problems caused by the axial displacement of the rotating shaft, thereby improving the machining accuracy of the machine tool. Second embodiment FIG. 9 illustrates the second embodiment of the present invention, in which parts similar to those previously described are designated with like or corresponding reference numerals. In this embodiment, the axial distance between the first and second rolling elements 1' and 2' is greater than that in the first embodiment. The purpose of this configuration is to increase the stiffness characteristics of the bearing 100' and to minimize the radial distance between the rolling elements 1 and 2. Third embodiment FIG. 10 illustrates the third embodiment of the present invention, in which like reference numerals designate like or corresponding parts. In this embodiment, a member 8" which corresponds to the inner ring 8" of the first embodiment is formed integrally with the rotating shaft 3". The member 8" has a second rolling contact surface 1b" formed on its outer periphery thereof and a third rolling contact surface 2a" formed on its inner periphery thereof. According to the embodiment, the bearing 100" requires fewer parts and the rolling contact surfaces 1b" and 2a" have greater stiffness characteristics. Fourth embodiment FIG. 11 illustrates the fourth embodiment of the present invention, in which like reference numerals designate like or corresponding parts. Two conventional angular contact ball bearings 18 are utilized in this embodiment. The outer ball bearing 18 is mounted between the outer ring 5''' and a member 8''' corresponding to the inner ring 8 while the inner ball bearing 18 is mounted between the member 8 and the angular member 6'''. As shown in FIG. 11, parts having the rolling contact surfaces 1a''', 1b''', 2a''', and 2b''' can be easily arranged on the commercially available ball bearings 18 according to this configuration.

It should be noted that the second, third, and fourth embodiments provide the same advantages and effect as the first embodiment, except those described above.

As there may be many other modifications, alterations;, and changes without departing from the scope or spirit of the essential characteristics of the present invention, it is to be understood that the above embodiment is only an illustration and not restrictive in any sense. The scope or spirit of the present invention is limited only by the terms of the appended claims.

What is claimed is:

1. A device having a bearing structure for supporting a rotating shaft on a fixed part, said device comprising
    an operating element coupled to one end of said rotating shaft, and
    a bearing structure positioned for supporting said rotating shaft on said fixed part, said bearing structure having an angular contact anti-friction bearing which includes
        a plurality of first rolling elements and a plurality of second rolling elements both interposed between said rotating shaft and said fixed part,
        a fixed member provided on said fixed part,
        a rotatable member provided on said rotating shaft,
        a first rolling contact surface formed on said fixed member so as to be in contact with said first rolling elements along a circumferential portion thereof extending from said fixed part toward said rotating shaft,
        a second rolling contact surface formed on said rotatable member so as to be in contact with said first rolling elements along a circumferential portion thereof extending from said rotating shaft toward said fixed part,
        a third rolling contact surface formed on said rotatable member so as to be in contact with said second rolling elements along a circumferential portion thereof extending from said fixed part toward said rotating shaft, and
        a fourth rolling contact surface formed on said fixed member so as to be in contact with said second rolling elements along a circumferential portion thereof extending from said rotating shaft toward said fixed part,
    wherein during operation said rotating shaft experiences thermal expansion producing an increase in the axial distance between said operating element and said rotatable member and wherein said rotatable member experiences radial thermal expansion, said bearing structure converting said rotatable member radial thermal expansion into an axial displacement of said rotating shaft in a direction that compensates for said rotating shaft thermal expansion thereby to attain high positional accuracy of said operating element.

2. The bearing structure in accordance with claim 1 wherein said angular contact anti-friction bearing support is said rotating shaft on the inner side of the fixed member and said fixed member is secured to the inner periphery of said fixed part, and said rotatable member is secured to the outer periphery of said rotating shaft.

3. The bearing structure in accordance with claim 2 wherein said fixed member comprises an outer ring secured to said fixed part and an angular member secured to one end of said outer ring, wherein said first rolling contact surface is formed on said outer ring and said fourth rolling contact surface is formed on said angular member.

4. The bearing structure in accordance with claim 3 further comprising a means for locating said outer ring and said angular member in a predetermined position on said fixed part.

5. The bearing structure in accordance with claim 2 wherein said rotatable member includes an inner ring, said inner ring being a member independent of said rotating shaft, and a means for securing said inner ring to a predetermined position on said rotating shaft.

6. The bearing structure in accordance with claim 5 wherein said rotatable member includes a portion protruding substantially in parallel to said rotating shaft, said second rolling contact surface being formed on the outer periphery of said protruding portion and said third rolling contact surface being formed on the inner periphery of said protruding portion.

7. The bearing structure in accordance with claim 2 wherein the rotatable member is integrally formed with said rotating shaft.

8. A bearing structure for supporting a main shaft on the inner side of a fixed part of a main shaft head in a machine tool, said main shaft being adapted to mount a workpiece engaging element on a front end thereof, said bearing structure including an angular contact anti-friction bearing supporting said main shaft and a radial roller bearing supporting said main shaft so as to allow axial displacement of said main shaft, said angular contact anti-friction bearing being located between said workpiece engaging element and said radial roller bearing, said angular contact anti-friction bearing comprising
    a plurality of first rolling elements and a plurality of second rolling elements both interposed between said main shaft and said fixed part,
    a fixed member secured to the inner periphery of said fixed part,
    a rotatable member secured to the outer periphery of said main shaft,
    a first rolling contact surface formed on said fixed member so as to be in contact with said first rolling elements along a circumferential portion thereof extending from said fixed part toward said main shaft,
    a second rolling contact surface formed on said rotatable member so as to be in contact with said first rolling elements along a circumferential portion thereof extending from said main shaft toward said fixed part, a third rolling contact surface formed on said rotatable member so as to be in contact with said second rolling elements along a circumferential portion thereof extending from said fixed part toward said main shaft, and a fourth rolling contact surface formed on said fixed member so as to be in contact with said second rolling elements along a circumferential portion thereof extending from said main shaft toward said fixed part, wherein said third rolling contact surface is located on the workpiece engaging element side of the center of said second rolling elements and said forth rolling contact surface is located on the roller bearing side of the center of said second rolling elements.

9. The bearing structure in accordance with claim 8 wherein said fixed member comprises an outer ring secured to said fixed part and an angular member secured to the roller bearing side of said outer ring, said first rolling contact surface being formed on said outer ring and said fourth rolling contact surface being formed on said angular member, and wherein said rotatable member includes a portion protruding substantially in parallel to said main shaft toward said roller bearing, said second rolling contact surface being formed on the outer periphery of said protruding portion and said third rolling contact surface being formed on the inner periphery of said protruding portion.

10. The bearing structure in accordance with claim 8 wherein said workpiece engaging element is a tool.

11. A bearing structure for supporting a rotating shaft on a fixed part, said bearing structure including an angular contact anti-friction bearing which comprises a plurality of first rolling elements and a plurality of second rolling elements both interposed between said rotating shaft and said fixed part, a fixed member provided on said fixed part, a rotatable member provided on said rotating shaft, a first rolling contact surface formed on said fixed member so as to be in contact with said first rolling elements along a circumferential portion thereof extending from said fixed part toward said rotating shaft, a second rolling contact surface formed on said rotatable member so as to be in contact with said first rolling elements along a circumferential portion thereof extending from said rotating shaft toward said fixed part, a third rolling contact surface formed on said rotatable member so as to be in contact with said second rolling elements along a circumferential portion thereof extending from said fixed part toward said rotating shaft, and a fourth rolling contact surface formed on said fixed member so as to be in contact with said second rolling elements along a circumferential portion thereof extending from said rotating shaft toward said fixed part, wherein said angular contact anti-friction bearing supports said rotating shaft on the inner side of the fixed member and said fixed member is secured to the inner periphery of said fixed part, and said rotatable member is secured to the outer periphery of said rotating shaft, and wherein said fixed member includes an outer ring secured to said fixed part and an angular member secured to one end of said outer ring, wherein said first rolling contact surface is formed on said outer ring and said fourth rolling contact surface is formed on said angular member.

12. The bearing structure in accordance with claim 11 further comprising a means for locating said outer ring and said angular member in a predetermined position on said fixed part.

13. A bearing structure for supporting a main shaft on the inner side of a fixed part of a main shaft head in a machine tool, said main shaft being adapted to mount a workpiece engaging element on a front end thereof, said bearing structure including an angular contact anti-friction bearing supporting said main shaft and a radial roller bearing supporting said main shaft so as to allow axial displacement of said main shaft, said angular contact anti-friction bearing being located between said workpiece engaging element and said radial roller bearing, said angular contact anti-friction bearing comprising a plurality of first rolling elements and a plurality of second rolling elements both interposed between said main shaft and said fixed part, a fixed member secured to the inner periphery of said fixed part, a rotatable member secured to the outer periphery of said main shaft, a first rolling contact surface formed on said fixed member so as to be in contact with said first rolling elements along a circumferential portion thereof extending from said fixed part toward said main shaft, a second rolling contact surface formed on said rotatable member so as to be in contact with said first rolling elements along a circumferential portion thereof extending from said main shaft toward said fixed part, a third rolling contact surface formed on said rotatable member so as to be in contact with said second rolling elements along a circumferential portion thereof extending from said fixed part toward said main shaft, and a fourth rolling contact surface formed on said fixed member so as to be in contact with said second rolling elements along a circumferential portion thereof extending from said main shaft toward said fixed part, wherein said third rolling contact surface is located on the workpiece engaging element side of the center of said second rolling elements and said forth rolling contact surface is located on the roller bearing side of the center of said second rolling elements, and wherein said fixed member comprises an outer ring secured to said fixed part and an angular member secured to the roller bearing side of said outer ring, said first rolling contact surface being formed on said outer ring and said fourth rolling contact surface being formed on said angular member, and wherein said rotatable member includes a portion protruding substantially in parallel to said main shaft toward said roller bearing, said second rolling contact surface being formed on the outer periphery of said protruding portion and said third rolling contact surface being formed on the inner periphery of said protruding portion.

* * * * *